SYSTEM FOR ISOLATING MULTI-FREQUENCY SIGNAL COMPONENTS

Filed Nov. 22, 1963

INVENTORS.
LANGTHORNE SYKES
DUANE J. RUSSELL
CYRIL D. HANSEN
BY
[signature]
ATTORNEY.

United States Patent Office 3,327,227
Patented June 20, 1967

3,327,227

SYSTEM FOR ISOLATING MULTI-FREQUENCY SIGNAL COMPONENTS

Langthorne Sykes, Palos Verdes Estates, Duane J. Russell, China Lake, and Cyril D. Hansen, Bakersfield, Calif., assignors to the United States of America as represented by the Secretary of the Navy Filed Nov. 22, 1963, Ser. No. 325,799
3 Claims. (Cl. 328—137)

The invention described herein may be manufactured and used by or for the Government of the United States of America for governmental purposes without the payment of any royalties thereon or therefore.

This invention relates generally to signal frequency analyzers, and more particularly to a system for separating and isolating component signals from a multi-frequency composite signal.

It is the general object of the present invention to provide a circuit combination which effects separation and isolation of component signals from a composite signal without requiring individual selective filters for extraction of each of the component signals.

It is another object of the invention to provide a circuit combination eleminating the need for having a number of highly selective filters as ordinarily required to effect separation and isolation of signal components of a multi-frequency signal.

It is a further and more specific object of the invention to provide a circuit combination, employing a single filter network, operating upon a two-frequency composite signal to effect extraction of each of the two component signals.

Other objects, features and many of the attendant advantages of this invention will be readily appreciated as the same becomes better understood by reference to the following detailed description when considered in connection with the accompanying drawing wherein.

As applied to the specific case of a composite input signal made up of two component signals $S_1$ and $S_2$ at differing frequencies, the invention is based upon the concept of employing a single filter network, of any suitable type functioning to impose phase inversion (or a phase shift of $\pi$ radians) upon only one of the component signals without affecting the phase of the other component signal, together with an inverter circuit, in an arrangement yielding two other composite signals, say $S_1-S_2$ and $-S_1-S_2$, the relative phases of the component signals and their combinations in the three composite signals differing in such manner that summation of one pair of these composite signals effects cancellation of one component signal (say $S_1$) and delivery of the other ($S_2$), and summation of another pair of these composite signals effects cancellation of the other component signal ($S_2$) and delivery of the remaining one ($S_1$).

Figure 1:
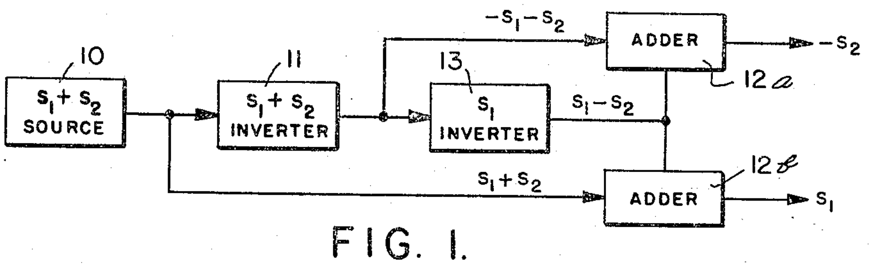
FIG. 1 illustrates, in block diagram form, an exemplary combination of circuit units for effecting components signal extraction in accordance with principles of the present invention.

The invention will be better understood by reference to the drawing wherein each of the block units may be of entirely conventional character, and wherein like reference characters are used throughout to designate like or coresponding elements. Referring first to FIG. 1, the composite input signal delivered by source 10 may be derived from separate devices but in any event is a summation of signals $S_1$ and $S_2$ when aplied to inverted 11, as indicated. The component signals $S_1$ and $S_2$ are to be understood as occurring at two different but known frequencies $f_1$ and $f_2$, with say frequency $f_1$ lower than frequency $f_2$. Inverter 11 functions to effect inversion of the composite signal and thus of each of the component signals therein, yielding another composite signal which may be expressed as $-S_1-S_2$. For such purpose, inverter 11 in this embodiment may take simply the form of an amplifier whose output signal is phase-inverted relative to the input signal. The signal $-S_1-S_2$ made available by inverter 11 is applied to an adder circuit 12_a_,and the signal $S_1+S_2$, taken directly from source 10 in this instance, is applied to an identical added circuit 12_b_. Also applied to each of the adder circuits is a composite signal $S_1-S_2$, as provided by inverter 13 which functions to impose phase inversion (equivalently, phase shift of $\pi$ radians) upon one of the component signals (in this instance upon the lower frequency signal $S_1$), without affecting the phase of the other component signal $S_2$. Adders 12_a_ and 12_b_ correspondingly effect cancellation of the component signals $S_1$ and $S_2$, respectively, in summation of the pairs of composite signals, in effect extracting and yielding the remaining component signals $S_2$ and $S_1$ as indicated. The negative sign of the signal $S_2$ output of adder 12_a_ simply indicates phase inversion of output signal $S_2$ relative to the component signal $S_2$ of the composite input signal $S_1+S_2$. While algebraic summation of the composite signals applied to the adders as shown in FIG. 1 (and likewise in FIGS. 2 and 3) might appear to yield output signals of magnitudes $2S_1$ and $2S_2$, the symbols $S_1$ and $S_2$ together with positive or negative sign here simply designate the component signals and their phase condition without reference to their magnitudes; the actual magnitudes of these signals at various points in the several circuits are of course dependent upon the effective attenuation or gain imposed by each unit; suitable circuit design and adjustment are of course to be understood as made in accordance with obvious equi-amplitude requirements for effecting complete cancellation, in the adders, of the component signals intended to be eliminated by the summation function of the adders.

Figure 2:
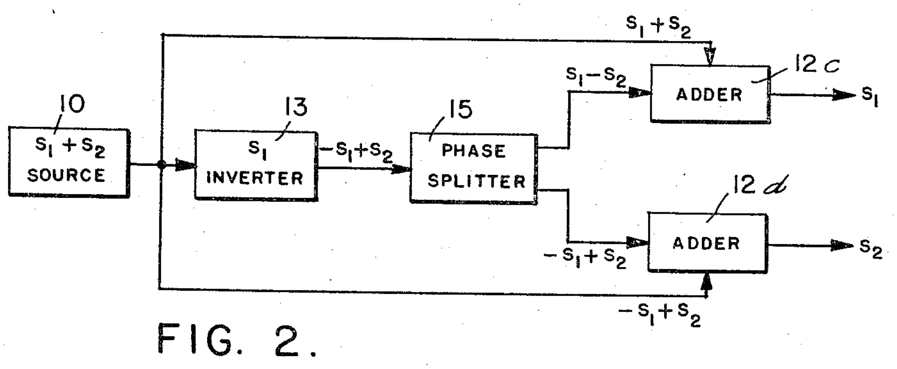
FIG. 2 illustrates, in block diagram form, another and preferred circuit combination embodying the invention.
Figure 3:
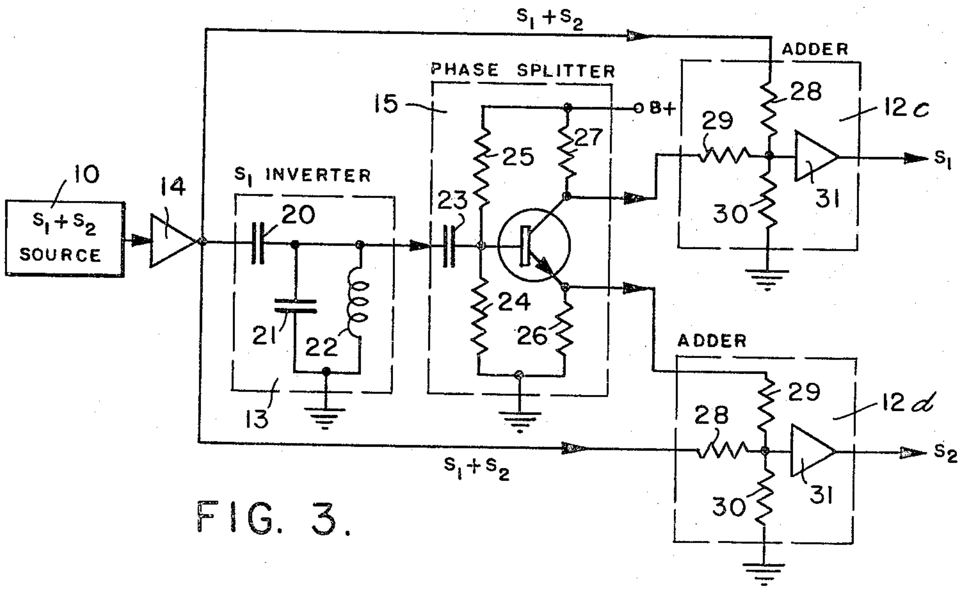
FIG. 3 presents basically the same arrangement as in the FIG. 2 block diagram, with inclusion of schematic circuits for several of the FIG. 2 block units.

FIGS. 2 and 3 illustrate another and preferred embodiment of the invention, in which only one A.C. load is presented to the signal $S_1$ inverter 13, and which has been found to provide better stability and effective operation over a greater range of input component signal magnitudes. It is the composite signal $S_1+S_2$ which in this instance is applied to both added circuits 12_c_ and 12_d_, and to the signal $S_1$ inverter 13, either directly as in the simplified block diagram of FIG. 2 or through an isolating amplifier 14 as in FIG. 3 (in this particular instance amplifier 14 produces no phase shift, but this is not essential to proper operation of the circuit combination. Signal $S_1$ inverter 13 thus yields the signal $-S_1+S_2$, and it is this composite signal which is next subjected to phase inversion. Additionally applied to the adder circuits 12_c_ and 12_d_, therefore, are the composite signals $S_1-S_2$ and $-S_1+S_2$, here obtained by use of a so-called phase splitter 15 following the signal $S_1$ inverter 13. Adders 12_c_ and 12_d_ correspondingly effect cancellation of the component signal $S_2$ and $S_1$, respectively, in summation of the pairs of composite signal, again in effect extracting and yielding the signals $S_1$ and $S_2$ as indicated.

While each of the units shown in the circuit combinations of FIGS. 1 and 2 have been indicated as of conventional type, typical circuits for certain of these units are given in FIG. 3 in order to provide a better understanding of how the invention may be practiced. For use in providing phase inversion of one component signal without affecting phase of the other component signal, as described, the signal $S_1$ inverter 13 may take the form of the illustrated three-element bandpass filter network for which design formulae will be found, for example, at pages 172 and 173 of "Reference Data for Radio Engineers" (4th edition), published 1956 by Federal Telephone and Radio Corporation. By way of specific example, however, for use in effecting phase inversion of component signal $S_1$ at a frequency $f_1$ of say 840 c.p.s. (cycles per second) without affecting the phase of component signal $S_2$ at a frequency $f_2$ of say 1260 c.p.s., suitable values for capacitor 20, capacitor 21 and inductor 22 would be 0.033 microfarad, 0.015 microfarad and 0.5 henry, respectively. Phase splitter 15 may employ an NPN transistor of 2N474A type; coupling capacitor 23 is here of 0.47 microfarad value; resistors 24 and 25 are each 1.5 megohms; resistors 26 and 27 are 10 and 22 kilohms, respectively. In each of the adders 12*c* and 12*d*, resistors 28 and 29, in conjunction with resistor 30, function to effect summing action of the resultant signals applied to resistors 28 and 29; resistors 28 and 29 may be provided in the form of adjustable resistors, say of 100 kilohms maximum resistance value, for equalization control of the opposed phase signals developed across resistor 30. Adders 12*c* and 12*d* preferably include buffer amplifiers 31, as indicated, not only to amplify the output signals $S_1$ and $S_2$, but also to isolate the summing resistor network and preceding stages from loading or disturbing effects of various utilization circuits to which the output signals may be applied.

While the invention has been described with specific reference to the case of a two-frequency composite signal, it will be understood that it may also be applied to extraction of component signals from a composite frequency having a greater multiplicity of component frequencies, for such purpose simply requiring expansion of the disclosed technique, and requiring one less filter than the number of component frequencies, and thus one less filter than is necessary in practice of prior art techniques. The present invention is particularly effective, useful and advantageous, however, as applied to a two-frequency composite signal, in such application providing the greatest gain in percentage reduction of filters required.

Having described in detail two distinct embodiments to facilitate an understanding of underlying principles of the present invention, it will further now be apparent that many modifications and variations are possible without departing from the invention. It is therefore to be understood that within the scope of the appended claims the invention may be practiced otherwise than as specifically described.

What is claimed is:

1. Apparatus for deriving, from a composite input signal consisting of first and second component signals characterized by differing frequencies, first and second output signals corresponding to said first and second component signals, respectively, said apparatus comprising, in combination:

(a) means for operating upon said composite input signal to provide a first intermediate composite signal wherein both said first and second component signals are phase-inverted;

(b) filter means for operating upon said first intermediate composite signal to provide a second intermediate composite signal wherein further phase-inversion is imposed upon said first component signal without affecting phase of said second component signal;

(c) first adder means for summing said composite input signal and said second intermediate composite signal, whereby to yield said first output signal; and (d) second adder means for summing said first and second intermediate composite signals, whereby to yield said second output signal.

2. Apparatus for deriving, from a composite input signal consisting of first and second component signals characterized by differing frequencies, first and second output signals corresponding to said first and second component signals, respectively, said apparatus comprising, in combination:

(a) filter means for operating upon said composite input signal to provide a modified composite signal wherein phase-inversion is imposed upon said first component signal without affecting phase of said second component signal;

(b) phase splitter means for operating upon said modified composite signal to provide a first intermediate composite signal corresponding to said modified composite signal, and to provide a second intermediate composite signal wherein further phase-inversion is imposed upon both said first and second composite signals;

(c) first adder means for summing said composite input signal and said second intermediate composite signal, whereby to yield said first output signal; and (d) second adder means for summing said composite input signal and said first intermediate composite signal, whereby to yield said second output signal.

3. Apparatus for deriving, from a composite input signal consisting of first and second component signals characterized by differing frequencies, first and second output signals corresponding to said first and second component signals, respectively, said apparatus comprising, in combination:

(a) filter means for operating upon said composite input signal to provide a first intermediate composite signal wherein phase inversion is imposed upon said first component signal without affecting phase of said second component signal;

(b) means for operating upon said first intermediate composite signal to provide a second intermediate composite signal wherein further phase-inversion is imposed upon both said first and second component signals;

(c) first adder means for summing said composite input signal and said second intermediate composite signal, whereby to yield said first output signal; and (d) second adder means for summing said composite input signal and said first intermediate composite signal, whereby to yield said second output signal.

References Cited

UNITED STATES PATENTS

| | | | |
|---|---|---|---|
| 2,450,818 | 10/1948 | Vermillion | 328—167 X |
| 2,607,007 | 8/1952 | Clark | 328—137 X |

ARTHUR GAUSS, *Primary Examiner.*

J. ZAZWORSKY, *Assistant Examiner.*